United States Patent [19]

Hamaue

[11] Patent Number: 5,072,968
[45] Date of Patent: Dec. 17, 1991

[54] SEAT BELT SYSTEM WITH TENSIONLESS FUNCTION AND ACCELERATION SENSOR

[75] Inventor: Tetsuya Hamaue, Shiga, Japan

[73] Assignee: Takata Corporation, Tokyo, Japan

[21] Appl. No.: 605,321

[22] Filed: Oct. 30, 1990

[30] Foreign Application Priority Data

Nov. 13, 1989 [JP] Japan .................................. 1-294279

[51] Int. Cl.⁵ .................... B60R 22/36; B60R 22/46
[52] U.S. Cl. ............................ 280/806; 242/107.4 A
[58] Field of Search ............................ 280/806, 807; 242/107.4 A, 107.4 R, 107.4 B, 107.6

[56] References Cited

U.S. PATENT DOCUMENTS

| 3,679,228 | 7/1972  | Settimi       | 280/807 X     |
|-----------|---------|---------------|---------------|
| 4,106,721 | 8/1978  | Ulrich        | 242/107.4 R X |
| 4,124,175 | 11/1978 | Cislak        | 242/107.7     |
| 4,458,920 | 7/1984  | Ozaki         | 242/107.6     |
| 4,714,274 | 12/1987 | Nagashima     | 242/107.6     |
| 4,856,728 | 8/1989  | Schmidt et al.| 242/107.4 A   |
| 4,936,601 | 6/1990  | Tada          | 280/806       |
| 4,941,683 | 7/1990  | Tabata et al. | 280/807       |
| 4,991,874 | 2/1991  | Tsuge et al.  | 280/806       |

Primary Examiner—Kenneth R. Rice
Assistant Examiner—Kevin Hurley
Attorney, Agent, or Firm—Kanesaka and Takeuchi

[57] ABSTRACT

A seat belt system comprises a retractor for performing a tensionless function to prevent take up of a seat belt, an acceleration sensor for sensing only a negative acceleration in the direction in which a vehicle is advanced, and a mechanism for cancelling the tensionless function of the retractor in accordance with a signal received from the sensor.

8 Claims, 10 Drawing Sheets

SEAT BELT SYSTEM WITH TENSIONLESS FUNCTION AND ACCELERATION SENSOR

FIELD OF THE INVENTION AND RELATED ART STATEMENT

The present invention relates to a seat belt system with a retractor which performs a tensionless function to prevent take up of a seat belt.

An automotive vehicle and the like typically includes a seat belt designed to protect a vehicle occupant from a secondary collision (collision between the vehicle occupant and the vehicle body due to inertia) during collision or under the emergent occasion by restraining the occupant in a seat.

With such a seat belt, separation of the seat belt from the occupant deteriorates the restraint effect of the seat belt. This is due to the fact that speed differential between the vehicle occupant and the vehicle is increased by a distance between the occupant and the seat belt.

On the other hand, some passengers may feel uncomfortable when they are restrained by the seat belts.

In order to eliminate such uncomfortableness, there has been proposed a seat belt retractor (hereinafter simply referred to as a retractor) which performs a tensionless function to cancel tension of the seat belt so as not to press the occupant under the normal circumstances.

In the seat belt system with such a retractor, the seat belt is closely contacted with the occupant seated in a seat once, and the occupant thereafter pulls the seat belt out of the retractor to loosen the same to a certain extent. The seat belt is then held in a tensionless state.

Such a retractor can prevent the occupant from feeling pressed by the seat belt under the normal running condition.

When a brake is suddenly applied under the emergent occasion, the vehicle occupant feels less safe than when he is in close contact with the seat belt since the slug (certain amount of loosening) is maintained between the vehicle occupant and the seat belt when the seat belt is held in a tensionless state as explained above. There remains a problem that some vehicle occupants even feel unsafe.

OBJECT AND SUMMARY OF THE INVENTION

It is an object of the present invention to provide a seat belt system for making a vehicle occupant feel safe such that he is protected or restricted by a seat belt under the emergent occasion, while taking advantage of a tensionless function.

In order to achieve the foregoing object, there is provided a seat belt system which comprises an acceleration sensor for sensing only a negative acceleration in the direction in which a vehicle is advanced, and a mechanism for cancelling a tensionless function of a retractor in accordance with a signal received from the acceleration sensor.

The present invention thus constructed operates as follows:

when a negative acceleration in the direction in which the vehicle is advanced is sensed by the acceleration sensor, then the cancelling mechanism is active to cancel a tensionless function of the retractor so that the seat belt is brought into close contact with the vehicle occupant. In this way, the vehicle occupant ±eels safe such that he is firmly restrained and protected by the seat belt under the emergent occasion, while taking advantage of the tensionless function of the seat belt.

DESCRIPTION OF THE PREFERRED EMBODIMENTS

The present invention will now be described with reference to the accompanying drawings.

Figure 1:
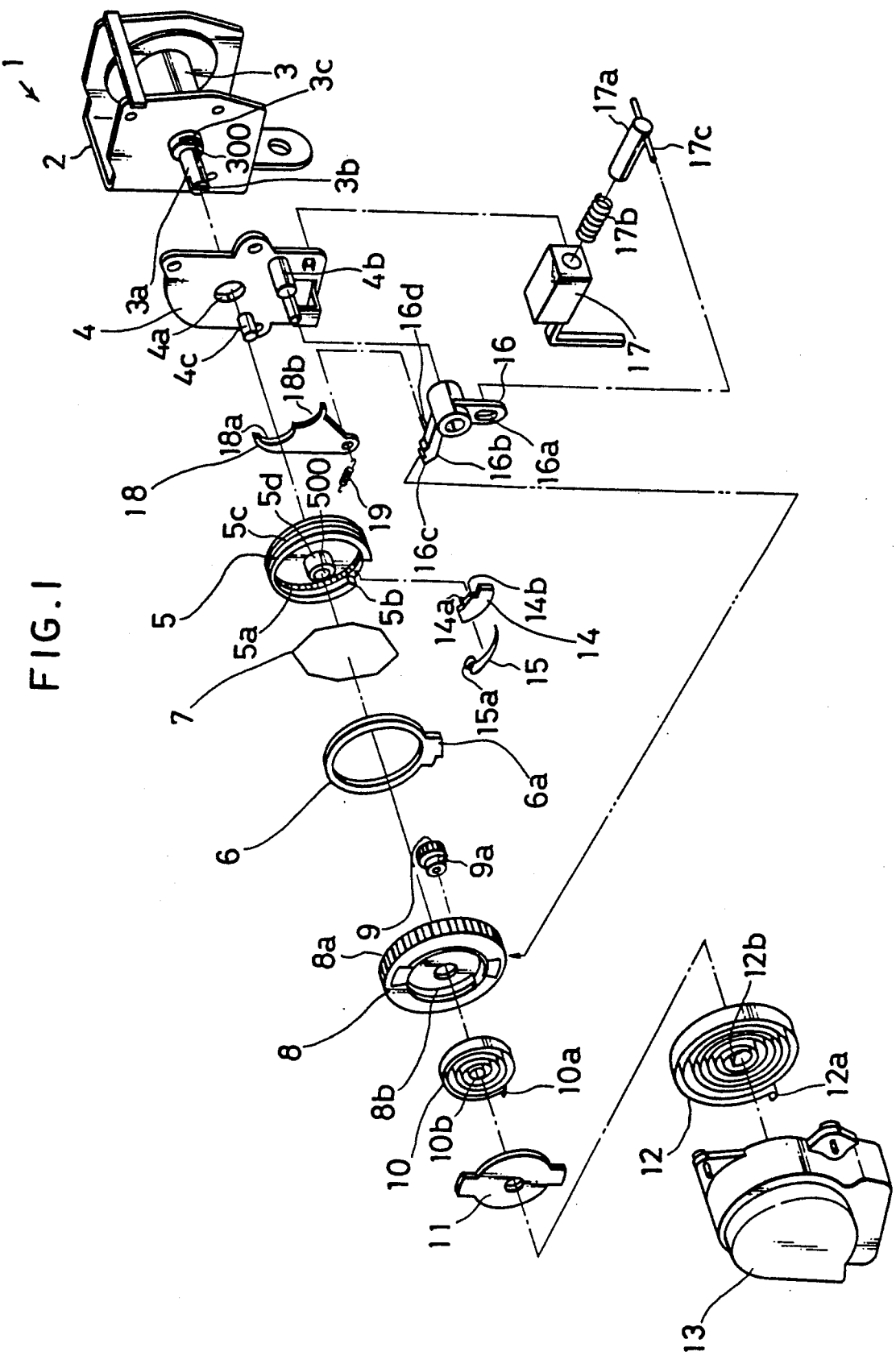
FIG. 1 is an exploded perspective view of a retractor mechanism in a seat belt system according to one embodiment of the present invention.
Figure 2:
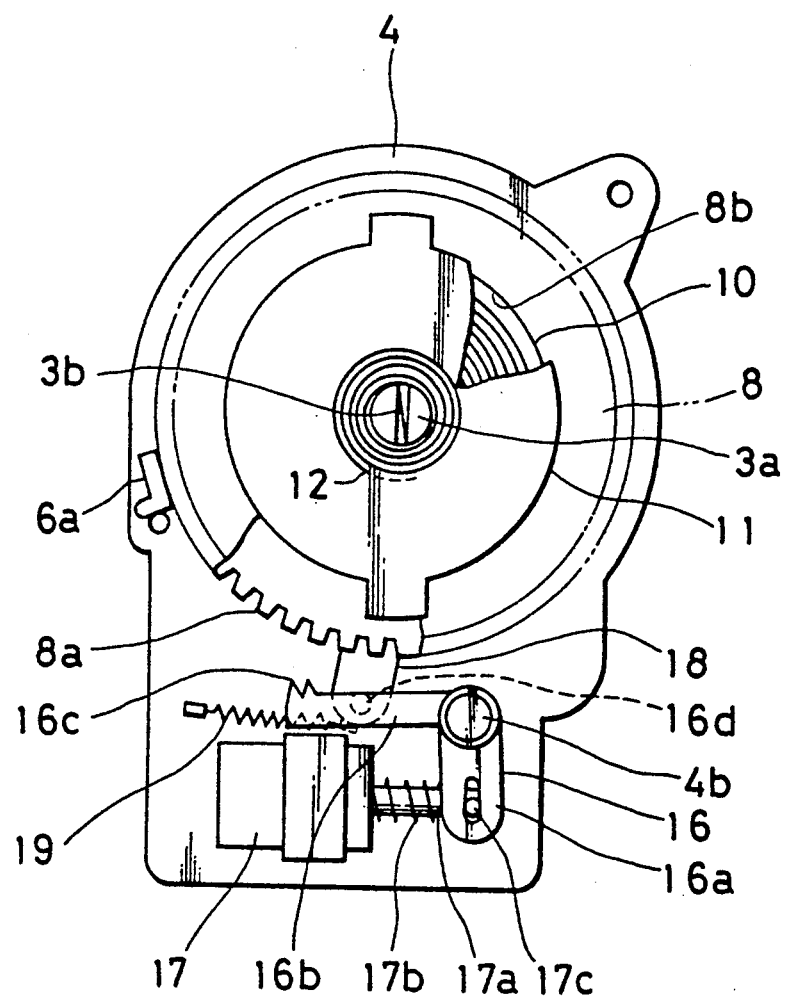
FIG. 2 is a side view, partly broken away, of the mechanism in assembly.
Figure 3:
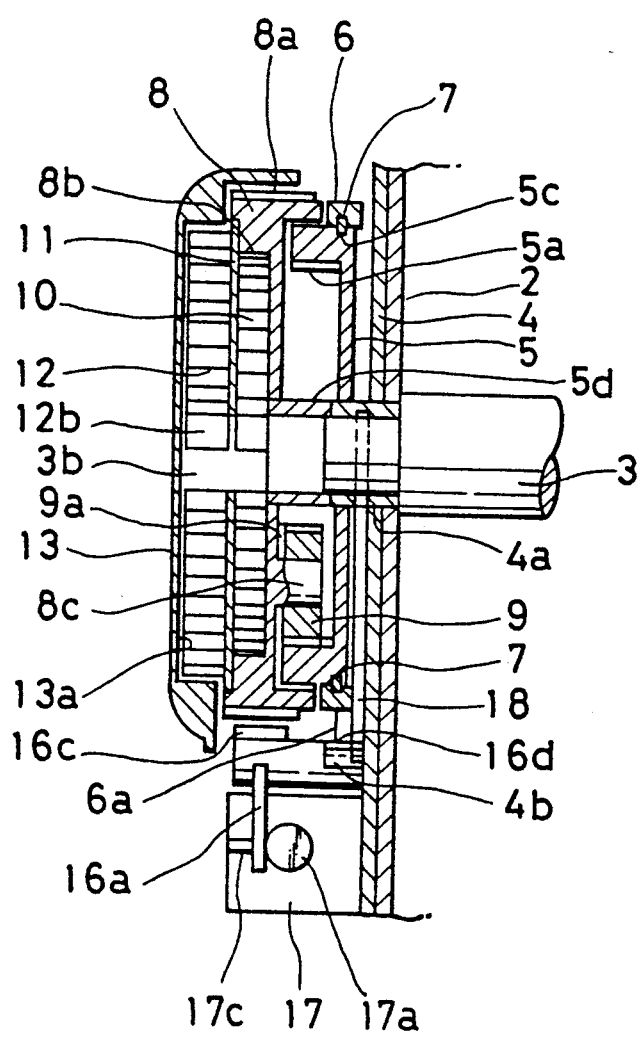
FIG. 3 is a vertical sectional view of the mechanism shown in FIG. 2.
Figure 4:
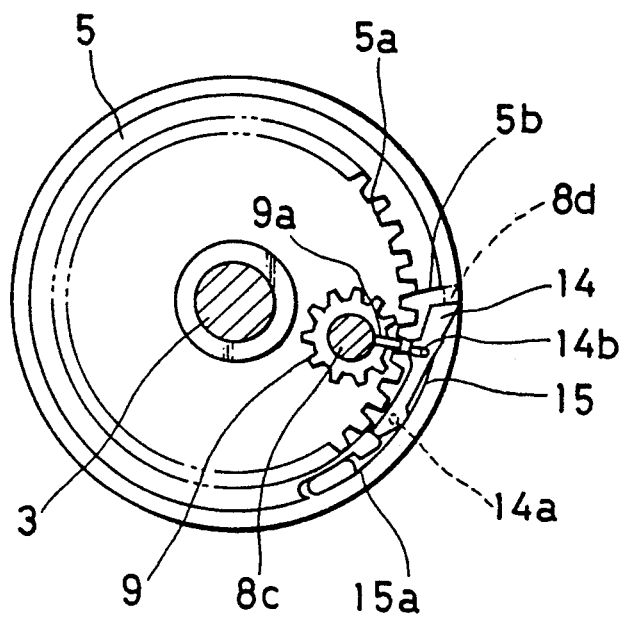
FIG. 4 is a side view of a gear plate.

FIG. 1 is an exploded perspective view of a seat belt system according to one embodiment of the present invention, particularly a retractor mechanism. FIG. 2 is a side view, partly broken away, of the mechanism in assembly. FIG. 3 is a vertical sectional view of the mechanism shown in FIG. 2. FIG. 4 is a side view of a gear plate.

A retractor 1 has a U-section and includes a body 2. Rotatably mounted to the body 2 is a reel shaft 3 to which one end of a seat belt 20 is secured. The reel shaft 3 has one 3a in which an axial groove 3b is formed. A known emergency device is mounted to the other end of the the reel shaft 3.

A retainer 4 is threaded or otherwise secured to one end of the body 2 by a suitable means. The retainer 4 has a through hole 4a through which the end 3a of the reel shaft 3 extends.

The retainer has a support shaft 4b by which a lever 16, which will be described later, is pivotally supported, and a pin 4c with which a projection 6a of a clutch plate 6 contacts.

The reel shaft 3 has a large diameter portion 3c around which a gear plate 5 is fit. The large diameter portion 3c has a recess 300. The gear plate 5 has an axial bore 500. The axial bore 500 has a step portion (not shown) for engagement with the recess 300. By this arrangement, the gear plate 5 and the reel shaft 3 are always rotated together. As shown also in FIG. 4, the gear plate 5 has inner teeth 5a, a recess 5b for receiving a hook 14 which will be described later, and a groove 5c for engagement with a clutch spring 7 which will be described later.

The projection 6a extends from the outer periphery of the clutch plate 6 and is adapted for engagement with a pin 16d of the lever 16. The clutch plate 6 is fit in the groove 5c of the gear plate 5 and rotatable relative to the gear plate 5 by the clutch spring 7.

The gear plate 5 has a shaft 5d. The gear holder 8 is rotatably mounted to the gear plate 5 with the shaft 5d extending through a central opening of the gear holder 8. As shown also in FIG. 3, the gear holder 8 has outer teeth 8a on its outer periphery with which a pawl 16c of the lever 16 is engageable, and a circular recess 8b in its one side for receiving a memory spring 10 which will be described later A support shaft 8c extends from the other side of the gear holder 8 and is adapted to support an idler gear 9. Also, a projection 8d extends from the other side of the gear holder 8 and is adapted to releasably engage with the hook 14 received in the gear plate 5. The gear holder 8 surrounds the gear plate 5.

The memory spring 10 is received within the recess 8b of the gear holder 8 and has an outer end 10a engaged with the gear holder 8 and an inner end 10b engaged with the groove 3b of the reel shaft 3. A spring cap 11 is fit in the side of the gear holder 8 to prevent release of the memory spring 10 from the gear holder 8. The spring cap 11 also serves as a partition between a return spring 12 and the memory spring 10.

A cover 13 is threaded or otherwise secured to the body 2 and has a spring receiving section 13a in which the return spring 12 is contained. The return spring 12 has an outer end 12a engaged with the cover 13 and an inner end 12b engaged with the groove 3b of the reel shaft 3.

The hook 14 is located within the recess 5b of the gear plate 5 and rotatable about a support shaft 14a as shown also in FIG. 4.

The hook 14 has a free end normally urged inwardly toward the shaft 5d by a hook spring 15 which has one end 15a engaged with the recess 5b of the gear plate 5, as shown in FIG. 4. The hook 14 has a projection 14b in its which is located in a face-to-face relation to the reel shaft 3. The projection 14b is in contact with a projection 9a of the idler gear 9. The hook 14 is supported by the spring 15 in order for the inwardly facing end of the projection 14b not to project inwardly beyond the tips of the inner teeth 5a of the gear plate 5, or in such a manner that the inwardly facing end of the projection 14b is coincident with the the tip of the inner teeth 5a. When the projection 14b of the hook 14 is brought into engagement with the projection 9a of the idler gear 9 to push the front end of the hook 14 out of the outer periphery of the gear plate 5, the hook 14 is engaged with the projection 8d of the gear holder 8 so as to prevent relative rotation between the gear holder 8 and the gear plate 5 in one direction.

As shown also in FIG. 2, the lever 16 is pivotally mounted to the support shaft 4b of the retainer 4 and has two arms. One of the arms 16a is connected to plunger 17a of a solenoid 17 through a pin 17c. The other arm 16b has the pawl 16c for meshing engagement with the outer teeth 8a of the gear holder 8. The arm 16b also has a pin 16d for engagement with the projection 6a of the clutch plate 6. When the solenoid 17 is energized, the lever 16 is rotated in such a direction that the pawl 16c is brought into meshing engagement with the outer teeth 8a of the gear holder 8. When deenergized, the lever 16 is returned to its original position under the action of the spring 17b.

As shown also in FIG. 3, a friction plate 18 is journalled by the pin 16d of the lever 16.

The friction plate 18 includes two continuous arcuate recesses 18a and 18b and has a front end inserted between the retainer 4 and the gear plate 5. A friction spring 19 (see FIG. 1) has one end attached to the retainer 4 and is used to urge the friction plate 18 in such a manner that the arcuate recess 18a is brought into contact with the side and the lower surface of the reel shaft 3. When the seat belt 20 is not pulled, the arcuate recess 18a is kept in contact with the side and the lower surface of the reel shaft 3. On the other hand, when the seat belt 20 is pulled, the arcuate recess 18a is separated from the side and the lower surface of the reel shaft 3 due to a friction between the reel shaft 3 and the seat belt 20 and a biasing force of the lever 16. In turn, the arcuate recess 18b is brought into contact with the lower surface of the reel shaft 3.

Figure 5:
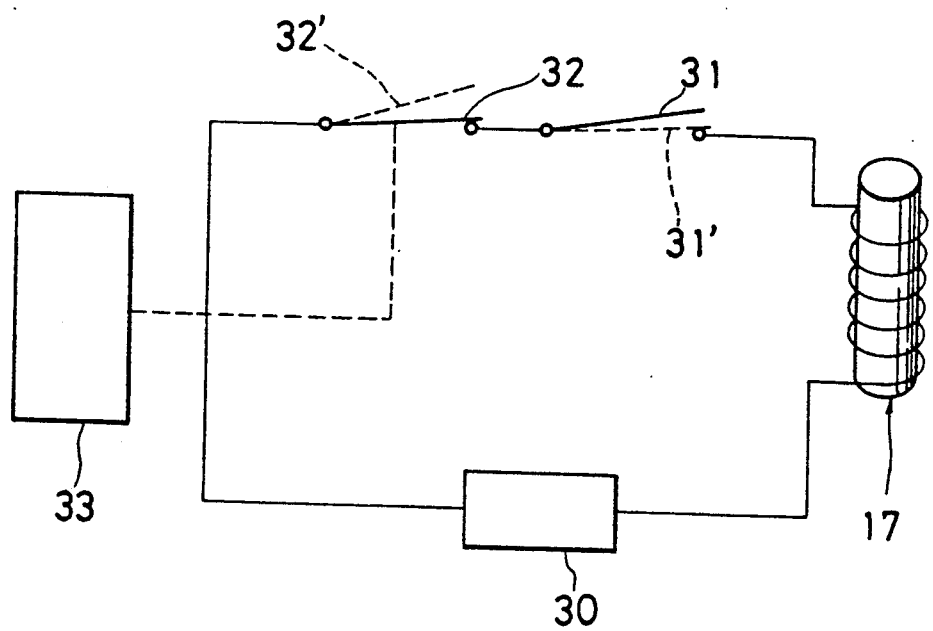
FIG. 5 is a circuit diagram showing mainly an electric system.

An electric system for the seat belt is shown in FIG. 5. FIG. 5 is a circuit diagram showing mainly the electric system.

The circuit as shown in FIG. 5 is provided within a buckle of the seat belt 20 and includes a buckle switch 31 which is on (a contact is closed) when a tongue of the seat belt 2o is inserted into the buckle, a switch 32, the solenoid 17 serially connected through the swtiches 31 and 32 and energized/deenergized when the switch 31 and 32 are on/off, and a power source 30 such as a battery for supplying power to these components. The switch 32 is normally on and is turned off when an acceleration sensor 33 detects a sudden negative acceleration in the direction in which a vehicle is advanced.

The acceleration sensor 33 will now be described in detail with reference to FIGS. 6A and 6B.

Figure 6A:
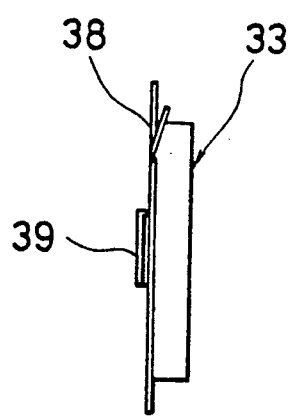
FIG. 6A is a front view showing one form of an acceleration sensor.
Figure 6B:
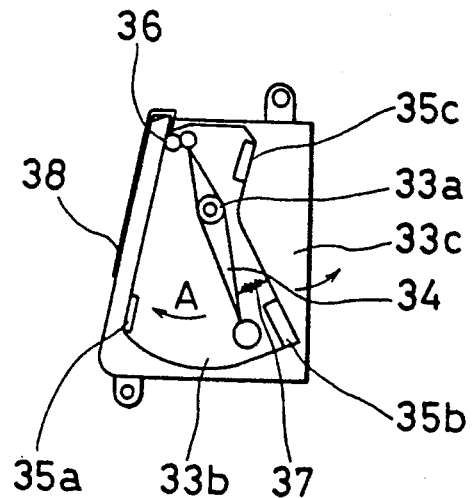
FIG. 6B is a side view of the acceleration sensor shown in FIG. 6A.

FIG. 6A is a front view of one form of the acceleration sensor 33, and FIG. 6B is a side view of the acceleration sensor 33.

With now reference to FIGS. 6A and 6B, the acceleration sensor 33 includes a case 33c having a recess 33b within which a horizontal shaft 33a extends, an electrically conductive pendulum 34 pivotable about the shaft 33a in a vertical plane, shock absorbing elements 35a through 35c bonded to the inner wall of the recess 33b with which the pendulum 34 are pivoted to contact, a terminal 36 always held in contact with one end of the pendulum 34 when no negative acceleration in the forward direction of the vehicle is applied to the pendulum 34, and a biasing member 37 designed to constantly bias the pendulum 34 toward the terminal 36 to contact the same. Lead wires 38 and 39 have ends connected to the terminal 36 and the pendulum 34, respectively and the other ends connected to the switch 32.

The acceleration sensor 33 thus described in detail is vertically mounted to a given place within the vehicle such that the arrow A is coincident with the direction in which the vehicle is advanced. In this embodiment, the sensor 33 is placed within a console panel, and the retractor 1 is mounted to a reinforcing member provided at one side of the seat.

In this embodiment, of the elements as described above, the gear holder 8, the lever 16, the solenoid 17 and the switch 32 together constitute a tensionless function cancelling mechanism and serve to cancel a tensionless function of the retractor 1 in accordance with a signal received from the acceleration sensor.

Function of the seat belt system will be described with reference to FIGS. 4, 5, and 7A to 7E.

SEAT BELT IN A STOWED POSITION

Figure 7A:
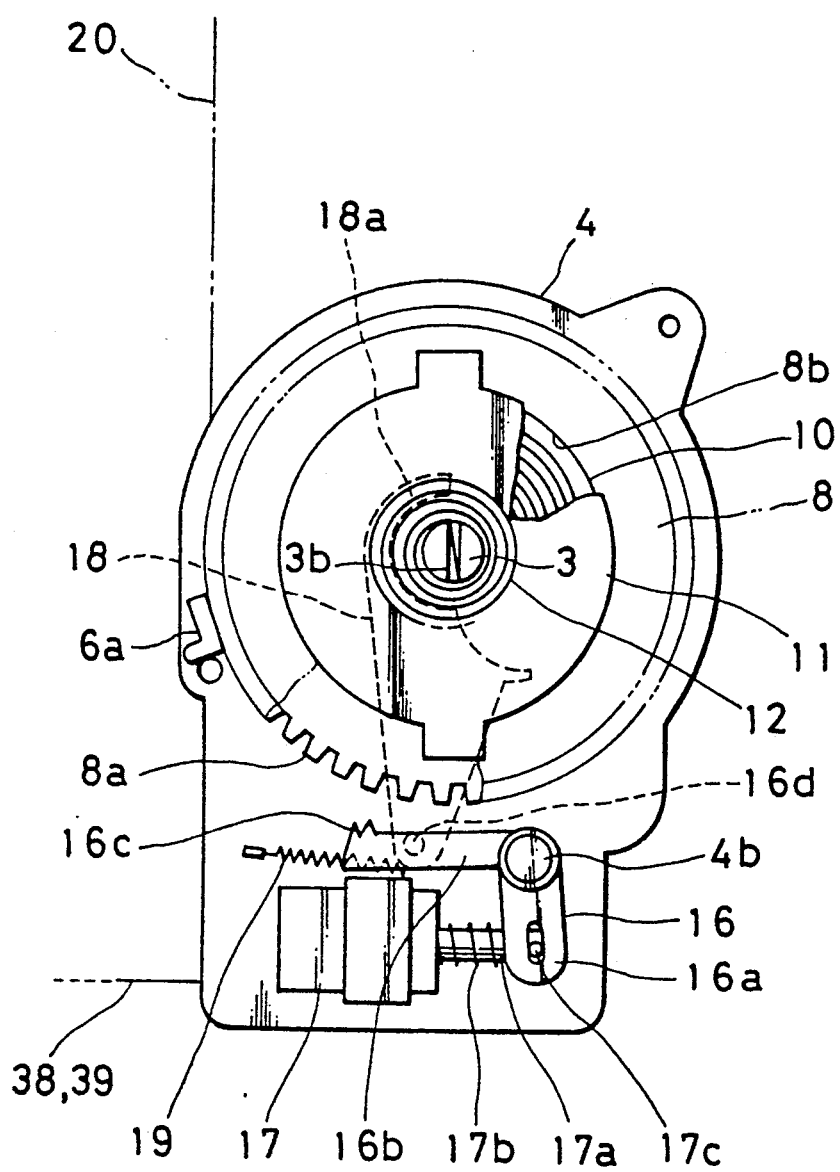
FIGS. 7A through 7E are views showing the manner in which the seat belt system is operated.

As shown in FIG. 7A, when the seat belt 20 is held in its stowed position, the solenoid 17 is rendered deenergized. The plunger 17a is, then, urged by the lever spring 17b, and the pawl 16c of the lever 16 is separated from the outer teeth 8a of the gear holder 8. Also, the arcuate recess 18a of the friction plate 18 is in contact with the side and the lower surface of the reel shaft 3 under the influence of the lever 16 and the friction plate spring 19. Under the circumstances, the projection 9a of the idler gear 9 is in engagement with the projection 14b of the hook 14, and the forward end of the hook 14 projects outwardly so as to engage with the projection 8d of the gear holder 8 as shown in FIG. 4. Accordingly, the gear holder 8 is free to rotate in such a direction as to take up the seat belt 20.

WHEN THE SEAT BELT IS PULLED OUT

Figure 7B:
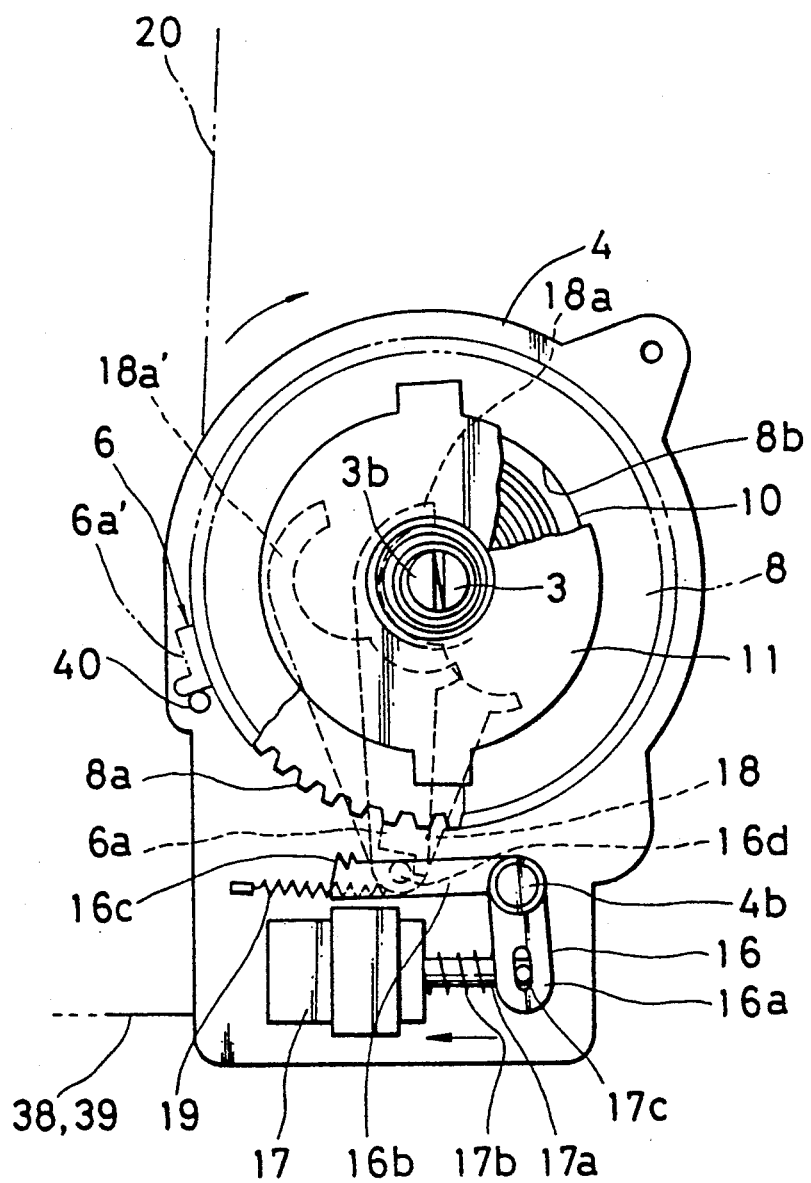

When the seat belt 20 is pulled out as shown in FIG. 7B, the gear plate 5 fixed to the reel shaft 3 is rotated. Such rotation of the gear plate 5 is then transmitted to the gear holder 8 through the memory spring 10 so as to rotate the gear holder 8 together therewith. Simultaneously, the clutch plate 6 is rotated in a clockwise direction. The friction plate 18 is also rotated about the pin 16d as the arcuate recess 18a receives a friction force from the outer peripheral surface of the reel shaft 3 and then separated from the side and the lower surface of the reel shaft 3 (shown as at 18a' in FIG. 7B). Such clockwise rotation causes the projection 6a of the clutch plate 6 to come into engagement with the pin 16d of the lever 16. As a result, only the clutch plate 6 is stopped.

When the tongue is, thereafter, inserted into the buckle by the vehicle occupant, the buckle switch 31 is turned on (the contact is closed) as at 31' in FIG. 5. The solenoid 17 is then energized to draw the plunger 17b against the action of the lever spring 17b. This causes the lever 16 to rotate in such a direction as to bring the pawl 16c into meshing engagement with the outer teeth 8a of the gear holder 8. Although the friction plate 18 is separated from the side and the lower surface of the reel shaft 3, the lever 16 can not be rotated since the projection 6a of the clutch plate 6 is in engagement with the pin 16d of the lever 16. The lever 16 is thus stopped while being urged in such a direction as to bring the pawl 16c of the lever 16 into engagement with the outer teeth 8a of the gear holder 8.

The vehicle occupant twists his body when he inserts the tongue into the buckle and thereafter, returns his body to an initial or driving position to face the front. When the vehicle occupant returns his body to its driving position, the set belt 20 tends to loose, but is rolled back into the retractor 1 to tightly fasten the occupant. At this time, the reel shaft 3 is rotated in such a direction as to roll the seat belt 20 back into the retractor 1. The rotation of the reel shaft 3 causes the gear plate 5, the gear holder 8 and the clutch plate 6 to rotate together. The projection 6a of the clutch plate 6 is then disengaged from the pin 16d of the lever 16. Also, the friction plate 18 is so rotated that the arcuate recess 18a is brought into contact with the side and lower surface of the reel shaft 3. The projection 6a of the clutch plate 6 comes into contact (as at 6a' in FIG. 7B) with a projection 40 of the cover 13 whereby the clutch plate 6 is stopped. On the other hand, the arcuate recess 18a is in contact with the side and lower surface of the reel shaft 3 since the friction plate 18 has been returned. As such, the pawl 16c of the lever 16 is prevented from being meshed with the outer teeth 8a of the gear holder 8.

SEAT BELT IN A TENSIONLESS STATE

Figure 7C:
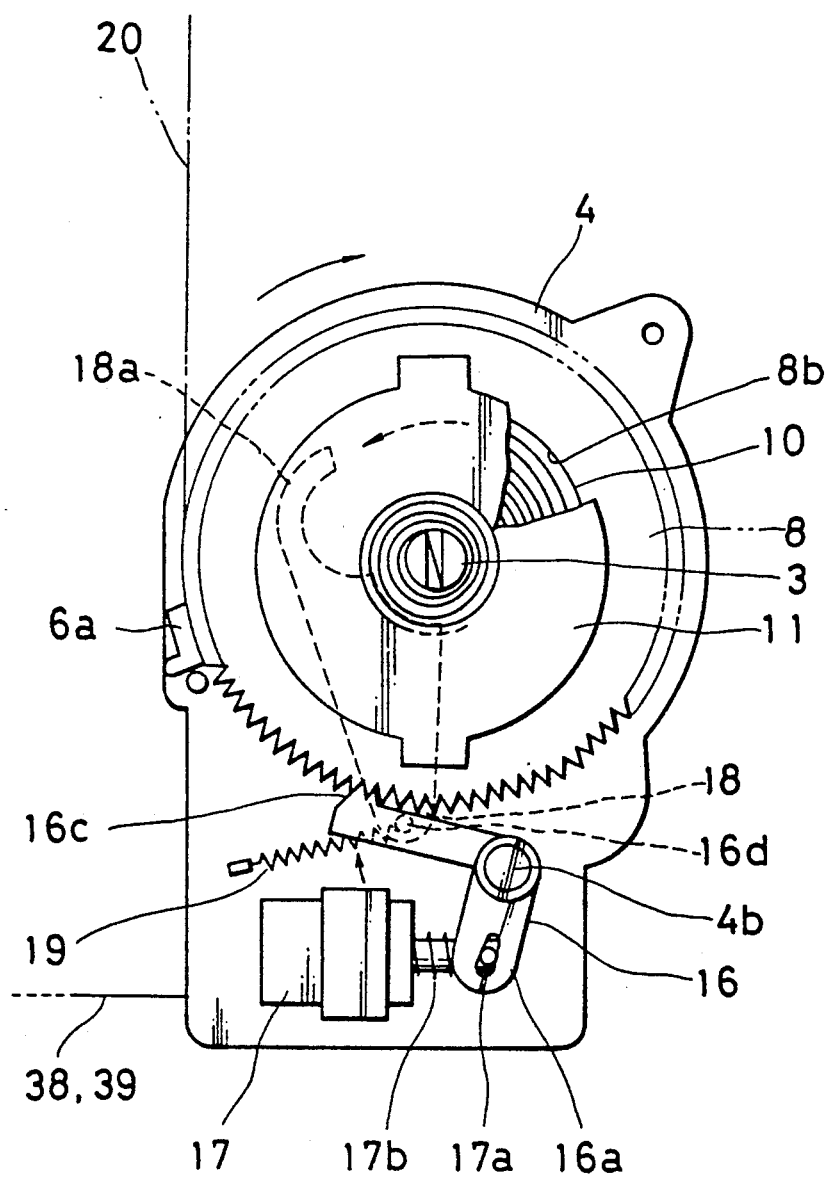

If the vehicle occupant slightly pulls out the seat belt 20, then the arcuate recess 18a of the friction plate 18 is rotated about the pin 16d of the lever 16 by a friction between it and the reel shaft 3 and a biasing force of the lever 16 (This is because the pawl 16c of the lever 16 is biased in such a direction as to engage the outer teeth 8a of the gear holder 8 upon energization of the solenoid 17) so as to move away from the side and the lower surface of the reel shaft as shown in FIG. 7C. The lever 16 is now free to rotate such that the pawl 16c of the lever 16 may be meshed with the outer teeth 8a of the gear holder 8 so as to lock the gear holder 8. If the gear holder 8 is locked, then the reel shaft 3 is prevented from rotating in such a direction as to take up the seat belt 20. In other words, no force is applied to take up the seat belt 20, and the seat belt is maintained in a tensionless state while being appropriately loosened.

MEMORY OF TENSIONLESS POSITION

Figure 7D:
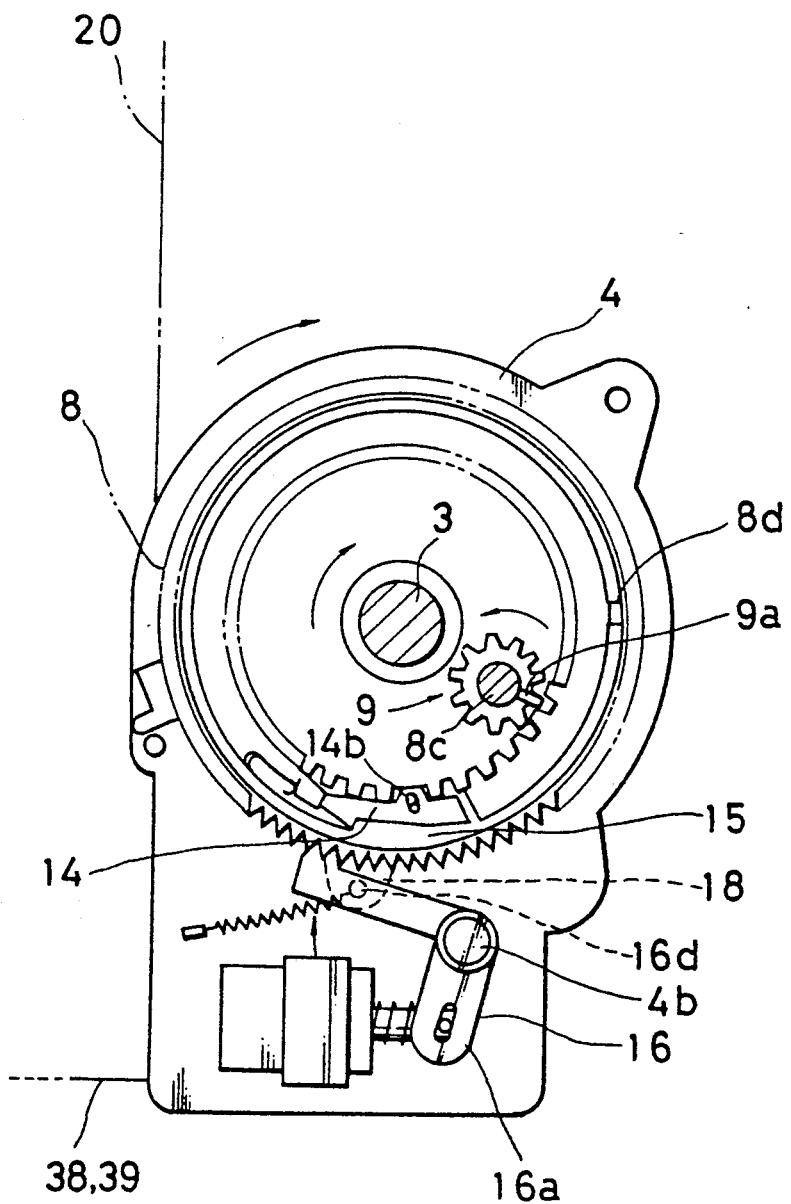

The position in which the reel shaft 3 is prevented from rotating to take up the seat belt 20 (or when the pawl 16c of the lever 16 is meshed with the outer teeth 8a of the gear holder 8) is a tensionless memory position. If the vehicle occupant is inclined or moved forwards from this position, then seat belt 20 is pulled out. This causes the reel shaft 3 to rotate in a clockwise direction so as to wind up the return spring 12 and the memory spring 10. The gear plate 5 fixed to the reel shaft is caused to rotate, but the gear holder 8 is in no way rotated as it is locked. The rotation of the gear plate 5 causes the idler gear 9 meshed with the inner teeth 5a of the gear plate 5 to rotate about the support shaft 8c of the gear holder 8 as shown in FIG. 7D. As a result, the projection 9a of the idler gear 9 is disengaged from the projection 14b of the hook 14. The forward end of the hook 14 is then contained within the gear plate 5 under the action of the hook spring 15. The gear holder 5 is now free to rotate together with the reel shaft 3 without interference with the projection 8d of the gear holder 8 and the hook 14.

When the vehicle occupant is next returned to its initial position, the seat belt 20 is taken up by a length as originally pulled out under the action of the return spring 12 and the memory spring 10. The projection 9a of the idler gear 9 is again brought into engagement with the projection 14b of the hook 14 as shown in FIG. 4. This causes the hook 14 to move outwardly. The hook 14 then comes into contact with the projection 8d of the gear holder 8, and the gear plate 5 and the reel shaft 3 are stopped. The seat belt is now held in a tensionless state.

WHEN A NEGATIVE ACCELERATION IS SUDDENLY APPLIED TO THE VEHICLE BODY

When a braking force is suddenly applied while the seat belt is held in such a tensionless state, the acceleration sensor 33 is operative to sense a negative acceleration in the direction in which the vehicle is advanced.

Figure 7E:
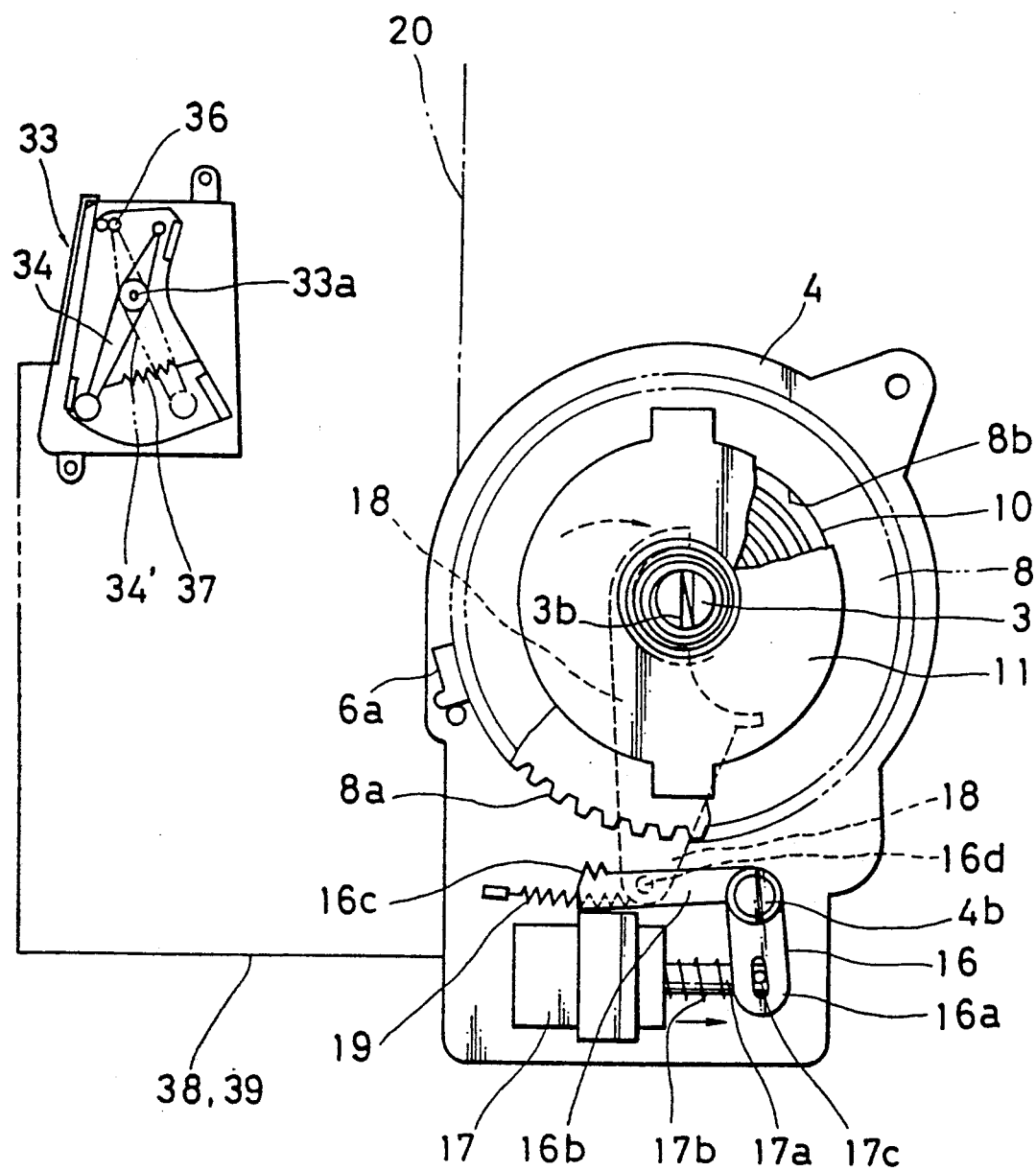

Specifically, when no such negative acceleration is sensed, the pendulum 34 of the acceleration sensor 33 is in contact with the terminal 36 (pendulum as at 34' in FIG. 7E). At this time, the switch 32 is on. When a sudden negative acceleration occurs, then the pendulum 34 is rotated clockwise about the shaft 33a against the action of the biasing member 37. This causes the pendulum 34 to separate from the terminal 36. An acceleration signal is send to the switch 32 to turn off the switch (as at 32' in FIG. 5).

The solenoid 17 is then deenergized so as to disengage the pawl 16c of the lever 16 from the outer teeth 8a of the gear holder 8. Also, the friction plate 18 is rotated about the pin 16d of the lever 16 under the action of the lever spring 17b and returned to its initial position. This causes the pawl 16c of the lever 16 to separate from the outer teeth 8a of the gear holder 8. The gear holder 8 is now free to rotate. The foregoing operation cancels the tensionless state of the seat belt 20. The seat belt 20 is then taken up under the action of the return spring 12, and the reel shaft 3 is locked by the emergency locking device so as to prevent the seat belt 20 from being pulled out.

With the seat belt system thus described in detail, the seat belt 20 is loosened to some extent so as to separate from the vehicle occupant while the vehicle is running under the normal condition. The occupant thus feels no pressure by the seat belt 20. On the other hand, when a sudden brake is applied under the emergent occasion, the acceleration sensor 33 is active to send a signal so as to instantaneously eliminate such loosening of the seat belt 20. The vehicle occupant thus feels safe such that he is protected or restrained by the seat belt under the emergent occasion, while taking advantage of the tensionless function of the seat belt 20.

It will be understood that the present invention is not limited to the illustrated embodiment, and various changes or modifications made be made therein within the scope of the appended claims. In the illustrated embodiment, the vehicle occupant slightly pulls out the seat belt 20 so that the seat belt 20 performs the tensionless function. Alternatively, a motor may be used to pull out the seat belt 20.

The acceleration sensor may be in the form of a phototube. Also, the acceleration sensor may calculate and detect acceleration in accordance with a change in the speed of the vehicle within a certain period of time.

According to the present invention, there is provided a seat belt system which makes a vehicle occupant feel safe such that he is protected or restrained by the seat belt under the emergent occasion while taking advantage of the tensionless function thereof.

What is claimed is:

1. A seat belt system comprising:
   a retractor for performing a tensionless function to prevent retraction of a seal belt;
   acceleration sensor means for sensing only a negative acceleration in the direction in which a vehicle is advanced; and
   cancelling means for cancelling the tensionless function of said retractor in accordance with a signal received from said acceleration sensor means;
   said retractor comprising:
   a reel shaft for taking up the seat belt, said retractor having an axially extending portion;
   a retractor body for rotatably supporting said reel shaft;
   a gear plate fixed to said reel shaft and having inner teeth;
   a disk-shaped gear holder having a central opening rotatably fit around said reel shaft, said gear holder including outer teeth on its outer periphery;
   a cover mounted to said retractor body to cover said gear plate and said gear holder;
   a helical return spring contained within said cover, said return spring having an inner end fixed to said reel shaft and an outer end fixed to said cover, whereby said reel shaft is always urged in a direction to take up the seat belt;
   a memory spring having an inner end fixed to said reel shaft and an outer end fixed to said gear holder, whereby said gear holder may be rotated in a direction to take up the seat belt;
   an idler gear rotatably supported by a support shaft extending from one side of said gear holder and having on its outer periphery teeth for meshing engagement with said inner teeth of the gear plate, said idler gear including a projection on its outer periphery;
   a hook including a base end pivotally supported by a peripheral edge of said gear plate and a free end movable out of and into the outer periphery of said gear plate, said free end of the hook being moved out of the outer periphery of said gear plate when engaged with said projection of said idler gear;
   a hook spring for urging said free end of said hook in a direction to move said free end of the hook into the outer periphery of said gear plate;
   said gear holder further including a projection engageable with said free end of the hook when the free end of said hook is moved out of the outer periphery of said gear plate, said gear holder being free to rotate in a direction to take up the seat belt when said projection of the gear holder is in engagement with said free end of the hook, said projection and said hook being brought into contact with one another when said gear holder is rotated in an opposite direction;
   a lever including a pawl engageable with said outer teeth of the gear holder, said lever being movable in such directions that said pawl may be engaged with and disengaged from said outer teeth;
   means for moving said lever in a forward direction such that said pawl may be engaged with said outer teeth; and
   means for moving said lever in a rearward direction such that said pawl may be disengaged from said outer teeth;
   said lever being active to prevent said gear holder from rotating in a direction to take up the seat belt when said pawl of the lever comes into engagement with said outer teeth, and said gear plate and said reel shaft being prevented from rotating in a direction to take up the seat belt when said hook comes into engagement with said projection of the gear holder, whereby said retractor is held in a tensionless state.

2. A seat belt system according to claim 1, said means for moving said lever in a rearward direction comprises a solenoid.

3. A seat belt system according to claim 1, said means for moving said lever in a rearward direction comprises a spring.

4. A seat belt system comprising:
   a retractor having a tensionless function to prevent retraction of a seat belt, said retractor including a reel shaft for receiving the seat belt; a return spring connected to said reel shaft to urge said seat belt in a direction for retracting the seat belt; a gear plate fixed to the reel shaft and having inner teeth; a gear holder rotatably situated around the reel shaft and having outer teeth on an outer periphery thereof; an idler gear rotatably attached to the gear holder and having teeth therearound, said idler gear meshing with the inner teeth of the gear plate, and; a lever having a pawl engagaeable with the outer teeth of the gear holder,
   an emergency locking device attached to the retractor for preventing seat belt from withdrawing from the retractor,
   acceleration sensor means for sensing only a negative acceleration relative to a forward moving direction of a vehicle, means for moving the lever in locking and unlocking positions relative to the outer teeth of the gear holder, said lever moving means, (a) when the seat belt is worn, being in the unlocking position so that the seat belt is withdrawn from the retractor, (b) when the withdrawn seat belt is slightly retracted and again withdrawn, allowing the lever to engage with the outer teeth of the gear holder to prevent further retraction of the seat belt to thereby provide the seat belt in a tensionless condition while the seat belt can be further withdrawn, and (c) when the acceleration sensor means senses predetermined negative acceleration, operating to disengage the lever from the outer teeth to thereby cancel the tensionless condition and retract the seat belt as much as possible.

5. A seat belt system according to claim 4, wherein said retractor further includes a clutch plate rotationally situated outside the gear plate, and a friction plate situated adjacent the gear plate, said clutch plate and friction plate operating to prevent engagement of the lever with the outer teeth when the seat belt is withdrawn and then retracted.

6. A seat belt system according to claim 4, wherein said retractor further includes a memory spring situated between the reel shaft and the gear holder, said memory spring, when the seat belt is withdrawn while the lever and the outer teeth engage together, operating to return the gear plate and the reel shaft to the tensionless condition.

7. A seat belt system according to claim 4, wherein said retractor further includes a hook having a base end pivotally supported by the gear plate and a free end movable out of and into an outer periphery of the gear plate, said free end being moved out of the outer periphery of the gear plate when engaged with a projection of the idler gear.

8. A seat belt system according to claim 7, wherein said gear holder includes a projection engageable with the free end of the hook when the free end of the hook is moved out of the outer periphery of the gear plate.

* * * * *